(12) United States Patent
Caspari et al.

(10) Patent No.: US 10,821,486 B2
(45) Date of Patent: Nov. 3, 2020

(54) MICROELECTRONIC MODULE FOR CLEANING A SURFACE, MODULE ARRAY, AND METHOD FOR CLEANING A SURFACE

(71) Applicants: AIRBUS DEFENCE AND SPACE GMBH, Ottobrunn (DE); AIRBUS OPERATIONS GMBH, Hamburg (DE)

(72) Inventors: Ralf Caspari, Kosching (DE); Robert Weichwald, Siegenburg (DE); Emanuel Ermann, Oberstimm (DE); Gerd Heller, Hellwege (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 31 days.

(21) Appl. No.: 15/343,886

(22) Filed: Nov. 4, 2016

(65) Prior Publication Data

US 2017/0144199 A1 May 25, 2017

(30) Foreign Application Priority Data

Nov. 5, 2015 (DE) .......................... 10 2015 014 256

(51) Int. Cl.
*B08B 7/00* (2006.01)
*B08B 13/00* (2006.01)
(Continued)

(52) U.S. Cl.
CPC .............. *B08B 7/0035* (2013.01); *B08B 6/00* (2013.01); *B08B 13/00* (2013.01); *B60S 1/62* (2013.01);
(Continued)

(58) Field of Classification Search
CPC ......... B08B 7/0035; B08B 13/00; B08B 6/00; B60S 1/62; B63B 59/00; B64F 5/30; B64D 2211/00; B64D 15/163
See application file for complete search history.

(56) References Cited

U.S. PATENT DOCUMENTS

| 4,516,747 | A | * | 5/1985 | Lurz | ....................... B64C 23/00 244/130 |
| 4,732,351 | A | | 3/1988 | Bird | |

(Continued)

FOREIGN PATENT DOCUMENTS

| CN | 1596060 A | 3/2005 |
| CN | 1693181 A | 11/2005 |

(Continued)

OTHER PUBLICATIONS

Anderson, et al., "Plasma Frequency Selective Surfaces," In: IEEE Transactions on Plasma Science, vol. 35, No. 2, pp. 407-415 dated Apr. 1, 2007.

(Continued)

*Primary Examiner* — Alexander Markoff
(74) *Attorney, Agent, or Firm* — Jenkins, Wilson, Taylor & Hunt, P.A.

(57) ABSTRACT

A microelectronic module for cleaning a surface is described. The microelectronic module comprises at least one voltage converter for converting a provided first voltage into a higher, lower, or identical second voltage. The module also comprises at least one actuator. The actuator comprises at least one generator for generating an ionic current, an electrical plasma, harmonic components and/or an electrostatic field from the second voltage which is provided by the voltage converter. At least the voltage converter and the (Continued)

actuator are disposed on a thin-film, planar substrate. At least most of at least one object adhering to the surface is removed by the actuator.

16 Claims, 4 Drawing Sheets

(51) Int. Cl.
*B64F 5/30* (2017.01)
*B08B 6/00* (2006.01)
*B60S 1/62* (2006.01)
*B63B 59/00* (2006.01)
*B64D 15/16* (2006.01)

(52) U.S. Cl.
CPC ............... *B63B 59/00* (2013.01); *B64F 5/30* (2017.01); *B64D 15/163* (2013.01); *B64D 2211/00* (2013.01)

(56) References Cited

U.S. PATENT DOCUMENTS

| | | | |
|---|---|---|---|
| 4,891,118 A | 1/1990 | Ooiwa et al. | |
| 5,172,024 A | 12/1992 | Broussoux et al. | |
| 5,535,906 A | 7/1996 | Drummond | |
| 5,542,200 A | 8/1996 | Matsuoka | |
| 5,844,369 A | 12/1998 | Yoshizako et al. | |
| 6,912,082 B1 | 6/2005 | Lu et al. | |
| 7,008,596 B1 | 3/2006 | Rump et al. | |
| 7,142,075 B1 | 11/2006 | Roesler et al. | |
| 7,255,062 B1 | 8/2007 | Higman | |
| 7,378,801 B2 | 5/2008 | Jeon | |
| 7,581,434 B1* | 9/2009 | Discenzo ........... | G01N 33/2888 73/53.01 |
| 7,624,941 B1 | 12/2009 | Patel et al. | |
| 7,703,479 B2 | 4/2010 | Jacob | |
| 7,811,941 B1 | 10/2010 | Becker et al. | |
| 8,091,836 B2 | 1/2012 | Minick | |
| 8,159,407 B2 | 4/2012 | Dittrich et al. | |
| 8,181,910 B2 | 5/2012 | Lewis | |
| 8,267,355 B1 | 9/2012 | Patel et al. | |
| 9,067,674 B2 | 6/2015 | Nordin et al. | |
| 9,975,625 B2 | 5/2018 | Silkey et al. | |
| 10,426,021 B2 | 9/2019 | Caspari et al. | |
| 2004/0223316 A1 | 11/2004 | Bachmann et al. | |
| 2006/0145630 A1* | 7/2006 | Jeon .................... | H05B 41/282 315/209 R |
| 2007/0216735 A1 | 9/2007 | Kobayashi et al. | |
| 2008/0245520 A1 | 10/2008 | Hyde et al. | |
| 2009/0120471 A1 | 5/2009 | Ludwiczak | |
| 2009/0173837 A1 | 7/2009 | Silkey et al. | |
| 2010/0108821 A1 | 5/2010 | Lewis | |
| 2012/0101776 A1* | 4/2012 | Brower ................. | B64D 43/00 702/183 |
| 2012/0193483 A1* | 8/2012 | Essenhigh ............ | B64C 23/005 244/205 |
| 2013/0197725 A1* | 8/2013 | O'Dell ................. | H04L 67/125 701/14 |
| 2014/0197732 A1 | 7/2014 | Schultz et al. | |
| 2014/0309820 A1* | 10/2014 | O'Dell ................. | H04L 67/125 701/3 |
| 2014/0366552 A1 | 12/2014 | Szwedowicz et al. | |
| 2015/0047732 A1 | 2/2015 | Bassler et al. | |
| 2016/0236794 A1* | 8/2016 | Tucker ................. | B64D 45/00 |
| 2016/0280379 A1 | 9/2016 | Giles et al. | |
| 2017/0043863 A1 | 2/2017 | Caspari et al. | |
| 2018/0035527 A1 | 2/2018 | Caspari et al. | |

FOREIGN PATENT DOCUMENTS

| | | |
|---|---|---|
| CN | 100998501 A | 7/2007 |
| CN | 103187521 A | 7/2013 |
| CN | 103213935 A | 7/2013 |
| CN | 104716440 A | 6/2015 |
| DE | 199 31 366 A1 | 2/2001 |
| DE | 101 29 041 A1 | 12/2002 |
| DE | 10261875 A1 | 7/2004 |
| DE | 103 20 467 B4 | 2/2006 |
| DE | 10 2004 060 675 A1 | 6/2006 |
| DE | 102007051243 B3 | 4/2009 |
| DE | 10 2014 110 405 | 1/2016 |
| EP | 2662284 A2 | 11/2013 |
| EP | 2560867 B1 | 3/2016 |
| EP | 3 133 014 B1 | 11/2018 |
| EP | 3 165 468 B1 | 3/2019 |
| FR | 2667256 A1 | 4/1992 |
| WO | WO 2008/030960 A2 | 3/2008 |
| WO | WO 2009/124913 A2 | 10/2009 |
| WO | WO 2015/024601 A1 | 2/2015 |

OTHER PUBLICATIONS

German Office Action for Application No. 10 2016 008 945 dated Apr. 11, 2017.
Kim, "Numerical Investigation of 3-D Radar Cross Section of Dielectric Barrier Discharge Plasma," In: Asia-Pacific Microwave Conference APMC dated Dec. 2015.
Lee, "Scattering Characteristics of Atmospheric Pressure Dielectric Barrier Discharge Plasma," In: Proceedings of the 10th European Radar Conference, pp. 555-558 dated Oct. 9, 2013.
Yuan, et al., "Properties of Propagation of Electromagnetic Wave in a Multilayer Radar-Absorbing Structure With Plasma- and Radar-Absorbing Material," In: IEEE Transactions on Plasma Science, vol. 39, No. 9, pp. 1768-1775 dated Sep. 1, 2011.
Extended European Search Report for Application No. 17001095.3 dated Dec. 14, 2017.
German Search Report for Application No. 16001567 dated Jan. 19, 2017.
Non-Final Office Action for U.S. Appl. No. 15/233,495 dated Sep. 14, 2017.
Final Office Action for U.S. Appl. No. 15/233,495 dated Feb. 9, 2018.
Non-Final Office Action for U.S. Appl. No. 15/233,495 dated Jun. 25, 2018.
German Search Report for Application No. 16002328 dated Jan. 26, 2017.
Chinese Office Action for Application No. 2017106178980 dated Nov. 2, 2018.
Final Office Action for U.S. Appl. No. 15/233,495 dated Nov. 27, 2018.
Non-Final Office Action for U.S. Appl. No. 15/656,333 dated Feb. 25, 2019.
Final Office Action for U.S. Appl. No. 15/233,495 dated Apr. 2, 2019.
Non-Final Office Action for U.S. Appl. No. 15/233,495 dated Aug. 9, 2019.
Chinese Office Action for Application No. 2017106178980 dated Jun. 26, 2019.
Interview Summary for U.S. Appl. No. 15/233,495 dated Sep. 27, 2019.
Chinese Office Action for Application No. 2017106178980 dated Sep. 10, 2019.
Final Office Action for U.S. Appl. No. 15/233,495 dated Jan. 23, 2020.

\* cited by examiner

MICROELECTRONIC MODULE FOR CLEANING A SURFACE, MODULE ARRAY, AND METHOD FOR CLEANING A SURFACE

CROSS-REFERENCE TO RELATED APPLICATION

This application claims priority to DE 10 2015 014 256.9 filed Nov. 5, 2015, the entire disclosure of which is incorporated by reference herein.

TECHNICAL FIELD

Different embodiments generally relate to a microelectronic module for cleaning a surface, and to a module array and to a method for cleaning a surface.

BACKGROUND

The development of modern vehicles, for example, modern aircraft, is continuously focused on lowering the costs for ongoing operation. Kerosene consumption, for example, is a major cost factor in this regard. In order to reduce the kerosene consumption in an aircraft, for example, attempts are being made, inter alia, to improve the aerodynamics of the aircraft. This is occurring, for example, in the region of the wings by means of so-called winglets, or by means of a particular structuring of parts of leading edges of wings in order to reduce the flow resistance of the aircraft. Improvements of this type are frequently based on a passive effect which, in the case of so-called riblets, for example, are based on reducing the frictional resistance on surfaces having turbulent air flow over them. Areas of the wings, in which, for example, contaminants result in an increase in frictional resistance, are frequently carefully cleaned, for example, in order to reduce the frictional resistance resulting from undesirable turbulence of the air flowing around. It is particularly advantageous to remove contaminants from wings having a partial laminar flow, in particular, especially since every contaminant generates turbulent flow and, therefore, increased resistance downstream thereof. These measures have the disadvantage, however, that they are time-consuming and expensive.

Proceeding therefrom, the problem addressed by the invention is that of providing a device which avoids the aforementioned disadvantages.

This problem is solved by a device having the features of claim 1. Exemplary embodiments are described in the dependent claims. It is pointed out that the features of the exemplary embodiments of the devices also apply for embodiments of the method and the use of the device, and vice versa.

SUMMARY

A microelectronic module for cleaning a surface is described. The microelectronic module comprises at least one voltage converter for converting a provided first voltage into a higher, lower, or identical second voltage. The module also comprises at least one actuator. The actuator comprises at least one generator for generating an ionic current, an electrical plasma, harmonic components and/or an electrostatic field from the second voltage which is provided by the voltage converter. At least the voltage converter and the actuator are disposed on a thin-film, planar substrate. At least most of at least one object adhering to the surface is removed by means of the actuator.

The invention is based on the concept of removing an object adhering to a surface by means of an ionic current, an electrical plasma, a harmonic wave and/or an electrostatic field and, therefore, of improving the flow around or over a surface, i.e., for example, of reducing a flow resistance. By integrating the components necessary therefore in a very small scale on a planar substrate, the module can be mounted on a vehicle so as to conform to the surface, for example. As a result, for example, the kerosene consumption of an aircraft which comprises, for example, a plurality of these modules on a leading edge of a wing, for example, can be reduced.

The term "surface" can be considered to be any type of surface, to which objects, for example, can adhere, and the adhesion of which is supposed to be reduced or even prevented by means of the device described herein.

The term "voltage converter" can be considered to be any electrical element which is capable of converting an input voltage into a higher, lower, or identical output voltage. For the case in which the input voltage corresponds to the output voltage, the electrical element can also consist of one electrical connecting element, for example.

The term "adhere" can be considered to be any type of an at least temporary type of connection which exists between an object and a surface. In this case, the connection is at least partially or entirely detachable at least with the aid of the device described herein, i.e., the connection between the object and the surface is disconnectable.

According to one preferred embodiment, the voltage converter comprises a piezoelectric transformer. This has the advantage that piezoelectric transformers can be produced in a very small scale.

According to one preferred embodiment, the thin-film, planar substrate is a flexible and/or multidimensionally deformable film or lattice. For example, the lattice can have a flexible and/or multidimensionally deformable lattice structure. Alternatively, the thin-film, planar substrate can also consist of a comparable material which is suitable for enabling the components of the module to be mounted on, in, or at said substrate, and which is as thin as possible and is sufficiently stable. For example, the substrate can also have a fabric or a lattice structure or a composite material. This has the advantage that the geometric dimensions of the module can be kept small, wherein a sufficient stability is given, in order to permanently or reversibly attach or mount the module, for example, on a surface, for example, adhesively. According to one preferred embodiment, the provided first voltage for the voltage converter is provided, at least partially, via an external voltage source. For example, the first voltage is provided by a voltage source outside of the module. For example, the voltage source can be an energy-generating element which, like the module, is mounted on a surface. Alternatively, the energy-generating element can also be, for example, a drive device of a vehicle, on the surface of which the module is mounted. This has the advantage that the geometric dimensions of the module can be kept very small.

According to one preferred embodiment, the substrate also comprises an energy-generating element for generating at least a portion of the first voltage to be provided. For example, one or multiple energy-generating elements of the same type or different types, which provide the first voltage for the module, can be disposed on the substrate. In addition to the at least one energy-generating element on the substrate, the module can also comprise a connection for providing at least a portion of the first voltage by means of an external voltage source. This has the advantage that the module is at least partially or entirely self-sufficient with respect to an external voltage source. This has the further advantage that the module can be flexibly mounted at or on any type of surface.

According to one preferred embodiment, the energy-generating element comprises a solar cell arrangement or an energy-harvesting element. An "energy-harvesting element" can be considered to be any element which is capable of collecting small amounts of electrical energy from sources such as ambient temperature, vibrations, or air flows. Structures which can be utilized therefor can also be referred to as nanogenerators.

Alternatively, the energy-generating element can also have any other type of suitable device for generating electrical energy. This has the advantage that the module is preferably independent of an external voltage source and can be operated self-sufficiently. This has the further advantage that the module can be flexibly mounted at or on any type of surface.

When the module is mounted on a surface of an aircraft, a solar cell arrangement is suitable for generating electrical energy, since an aircraft, in the flight phase, preferably flies above the cloud layer and is therefore not subjected to being shaded from the sun due to clouds.

According to one preferred embodiment, the module comprises a plurality of actuators. Due to the arrangement of multiple actuators on one module, one voltage transformer can be provided for multiple actuators, for example. This has the advantage that the available surface can be utilized more effectively.

According to one preferred embodiment, the module comprises at least one switching element for activating and/or deactivating the module and/or at least one of the plurality of actuators. Alternatively, a switching element can also be designed for two or more modules. Therefore, two or more modules can be activated and/or deactivated via the switching element. This has the advantage that the module can be specifically activated or deactivated and, therefore, individually controlled.

The term "switching element" can be considered to be any type of device which is suitable for changing a connection from a disconnected state to a connected state. This can also be considered to be a connection which is open on one side and which can be permanently or reversibly closed, for example, by connecting the module to, for example, an electronic unit for control purposes.

According to one preferred embodiment of the module comprising a plurality of actuators, the module can comprise one or multiple switching elements which are designed for activating and/or deactivating one or multiple actuators of the plurality of actuators. This has the advantage that the module can be individually controlled and the geometric dimensions can be kept small, depending on the application.

According to one preferred embodiment, the module comprises at least one detection unit. The detection unit is designed for detecting at least the presence of an object adhering to the module. A detection unit can be considered to be, for example, a sensor which is designed for detecting an object adhering to the module, for example, a contaminant. For example, the sensor or the detection unit can be based on optics, inductance, capacitance, or the like. This has the advantage that the module can be purposely activated in the event of the presence of an object on the module, for example, a contaminant, and can be deactivated again, for example, after the contaminant is removed.

According to one preferred embodiment, the actuator is further designed for detecting at least the presence of an object adhering to the module. Instead of a dedicated sensor, the actuator can be alternatively or additionally provided for detecting the presence of an adhering object, for example, a contaminant. This has the advantage that a contaminant, for example, can be detected and the module can be purposely activated in the event of the presence of an object on the module and can be deactivated again, for example, after the contaminant is removed.

According to one preferred embodiment, the module comprises at least one sensor. The sensor is designed for gathering information regarding the module, information regarding the adhering object and/or information regarding the environment of the module. The sensor can comprise, for example, multiple sub-sensors which are suitable for gathering information regarding the module, information regarding the adhering object and/or information regarding the environment of the module. This has the advantage that the module can specifically influence the actuator or actuators for cleaning the surface on the basis of the information regarding the module, information regarding the adhering object and/or information regarding the environment of the module.

According to one further embodiment, the sensor is a pressure sensor, a temperature sensor and/or a humidity sensor.

According to one preferred embodiment, the module comprises an acceleration sensor and/or a position sensor. With the aid of the acceleration sensor, the module can be activated, for example, when a predetermined minimum acceleration is detected. When a negative acceleration is present, the module can be, for example, deactivated or vice versa. With the aid of the position sensor, the position of the module can be determined, for example, wherein the module can be activated or deactivated in certain orientations. The acceleration sensor and/or the position sensor can be designed using MEMS technology, for example.

According to one preferred embodiment, the module comprises at least one receiver. The receiver is designed for receiving a signal, wherein the switching element can be switched depending on the signal. For example, a signal can be transferred to the module from a central control unit which comprises at least one transmitter. The signal can be used, for example, for activating or deactivating the module. Alternatively, the signal can also have a more complex structure, for example in order to partially activate and/or deactivate a plurality of actuators on a module or a plurality of modules. Alternatively, the voltage and/or amplitude of one or multiple actuators can also be controlled with the aid of a signal. This has the advantage that the module can be individually controlled.

According to one preferred embodiment, the module comprises a transmitter. The transmitter is designed for transmitting a signal to a receiver, wherein the signal includes at least information regarding the parameters detected by the module.

The signal includes, for example, information regarding pressure, temperature and/or humidity which act on the surface of the module. On the basis of the transmitted parameters, the control element can determine, for example, whether and how the second voltage to the actuator or the actuators can be adjusted. This has the advantage that the module can be individually controlled.

According to a further embodiment, the module comprises at least one receiver and at least one transmitter. The receiver and the transmitter preferably have the same properties as the previously described receiver and transmitter.

According to yet another embodiment, the module comprises one control element. The control element is designed for controlling the actuator or the actuators depending on the ascertained information and/or the presence of at least one adhering object. The control element receives the information, which has been gathered by a sensor on the module, for example, and controls the actuator or the plurality of actuators in such a way that the removal of an object adhering to the module, for example, a contaminant, is adjusted or changed. This has the advantage that the module can be individually controlled.

According to yet another embodiment, the voltage converter, the switching element, the actuator, the detection unit, the sensor, the receiver, the transmitter and/or the control element are designed as a MEMS (microelectromechanical system) structure. By designing preferably a majority of the components of the module as a MEMS structure, the geometric dimensions of the module can be kept very small.

A module array comprising a plurality of previously described microelectronic modules is also provided. This has the advantage that, by arranging a plurality of the modules in an array, the cleaning effect can be amplified and/or utilized in a specific manner.

According to one embodiment, multiple microelectronic modules can also be disposed on a shared, thin-film, planar substrate. This has the further advantage that the modules can be flexibly mounted at or on any type of surface.

According to one embodiment, the plurality of the modules is geometrically arranged in such a way that they have a predominant direction. This has the advantage that the modules for removing adhering objects can be arranged in a defined manner in a predefined area, for example, on the leading edge of an aircraft wing.

In this case, the actuators of the plurality of the modules are preferably arranged in such a way that said modules generate a wave front and/or an excitation of a soliton wave having a defined direction of propagation. A soliton wave or a soliton-type wave is considered to be a wave packet which preferably maintains its shape while it propagates.

According to one embodiment, the actuators of the plurality of the modules can be controlled in a delayed and/or out-of-phase manner. In this case, the intensity is preferably maximizable by utilizing interference phenomena. This has the advantage that the actuators of the module can be effectively used for cleaning a surface.

In addition, an arrangement of at least one previously described microelectronic module or at least one previously described module array is provided on and/or in a surface of an aircraft, a watercraft, or a land vehicle.

In addition, a method for cleaning a surface by using at least one previously described microelectronic module or at least one module array is provided. In the method, a provided first voltage is converted into a higher, lower, or identical second voltage. In addition, in the method, an ionic current, an electrical plasma, harmonic waves and/or an electrostatic field is generated depending on the second voltage. In the method, in addition, at least one object adhering on a surface of the module or of the module array is removed by means of the generated ionic current, electrical plasma, the harmonic waves and/or the electrostatic field.

In the method, preferably at least most of one object adhering to a surface of the module or of the module array is removed by means of the actuator.

BRIEF DESCRIPTION OF THE DRAWINGS

In the drawings, reference numbers that are generally the same refer to the same parts in all the different views. The drawings are not necessarily to scale; instead, value is placed, in general, on the explanation of the principles of the invention. In the following description, different embodiments of the invention are described with reference to the following drawings, in which.

DETAILED DESCRIPTION

Figure 1:
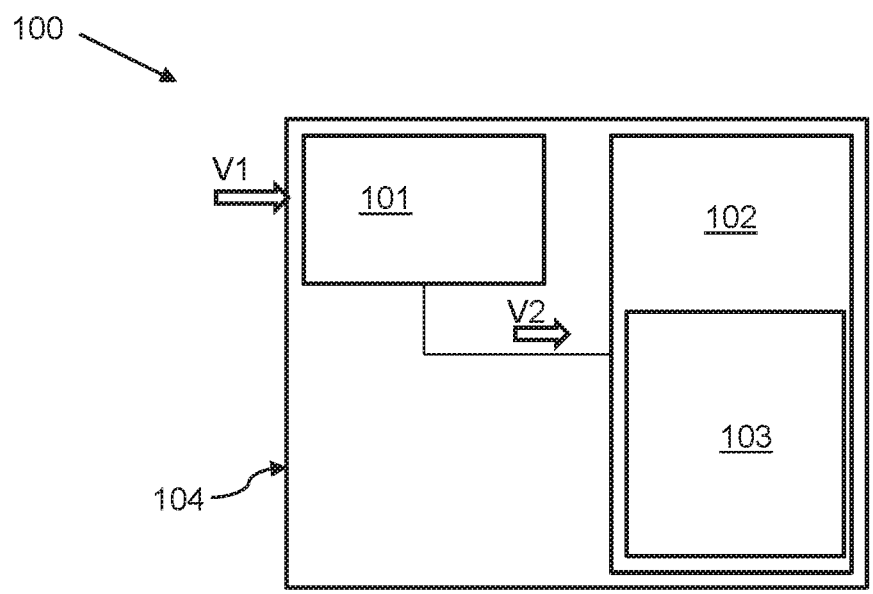
FIG. 1 shows a first embodiment of a microelectronic module.

The following detailed description refers to the attached drawings which, for the purpose of explanation, show specific details and embodiments in which the invention can be put into practice.

The expression "exemplary" is used in this case to mean "serving as an example, a case, or an illustration". Every embodiment or configuration described herein as "exemplary" should not necessarily be interpreted to be preferred or advantageous over other embodiments or configurations.

In the following extensive description, reference is made to the attached drawings which form a part of this description and in which, for purposes of illustration, specific embodiments in which the invention can be applied are shown. In this regard, directional terminology is used, such as, for example, "top", "bottom", "front", "back", "leading", "trailing", etc., with reference to the orientation of the described figure or figures. Since components of embodiments can be positioned in a number of different orientations, the directional terminology is used for purposes of illustration and is in no way limiting. It is clear that other embodiments can be used and structural or logical changes can be made without deviating from the scope of protection of the present invention. It is clear that the features of the different exemplary embodiments described herein can be combined with one another, unless specifically indicated otherwise elsewhere. The following extensive description should therefore not be interpreted to be limiting, and the scope of protection of the present invention is defined by the attached claims.

Within the scope of this description, the terms "connected" and "coupled" are used for describing both a direct as well as an indirect connection and a direct or an indirect coupling. In the figures, identical or similar elements are provided with identical reference numbers, to the extent this is appropriate.

In the method described here, the steps can be carried out in almost any arbitrary order without deviating from the principles of the invention if a temporal or functional sequence is not expressly mentioned. If it is explained in a patent claim that one step is carried out first and then multiple other steps are carried out one after the other, this is considered to mean that the first step is carried out before all the other steps, but the other steps can be carried out in any arbitrary, suitable order if a sequence has not been described within the other steps. Parts of claims, in which, for example, "step A, step B, step C, step D and step E" are carried out are considered to mean that step A is carried out first, step E is carried out last, and the steps B, C and D can be carried out in any arbitrary order between steps A and E, and the sequence falls within the formulated scope of protection of the claimed method. In addition, mentioned steps can be carried out simultaneously if an express wording in the claim does not state that they must be carried out separately. For example, one step can be carried out for carrying out X in the claim and one step for carrying out Y in the claim is carried out simultaneously within a single process, and the resultant process falls within the formulated scope of protection of the claimed method.

FIG. 1 shows a first embodiment of a microelectronic module 100 for cleaning a surface. The module 100 comprises a voltage converter 101 for converting a provided first voltage V1 into a higher, lower, or identical second voltage V2. The module 100 also comprises an actuator 102. The actuator 102 comprises at least one generator 103 for generating an ionic current, an electrical plasma, harmonic components and/or an electrostatic field from the second voltage v2 which is provided by the voltage converter 101. The voltage converter 101 and the actuator 102 of the module 100 are disposed on a thin-film, planar substrate 104. The voltage converter 101 and the actuator 102 of the module 100 are electrically coupled to one another. At least most of at least one object adhering to the surface is removed by means of the actuator 102. The module 100 can comprise a switching element (not illustrated) for the purpose of specifically activating and/or deactivating the actuator 103. In the embodiment shown, the module 100 receives the first voltage V1 from an external voltage source (not shown) to which the voltage converter 101 is connected. Alternatively, the voltage converter 101 can also be connected, for example, to a solar cell arrangement (not illustrated) which can be disposed on the substrate 104.

Figure 2:
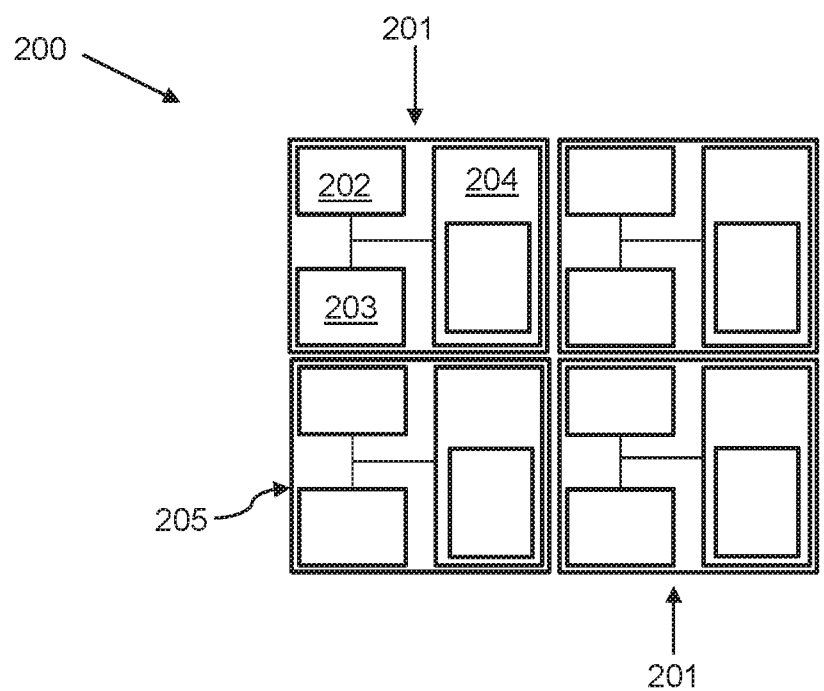
FIG. 2 shows a module array comprising a plurality of microelectronic modules.

FIG. 2 shows one embodiment of a module array 200 comprising a plurality of microelectronic modules 201. Each of the microelectronic modules 201 comprises a voltage converter 202, a switching element 203, and an actuator 204 on a thin-film, planar substrate 205. Although each of the depicted modules 201 comprises a separate switching element 204, according to an alternative embodiment (not illustrated), a switching element 204 can also be provided for two or more modules 201. The multiple modules 201 can be connected to each other, for example, or they can exist independently of each other.

Figure 3:
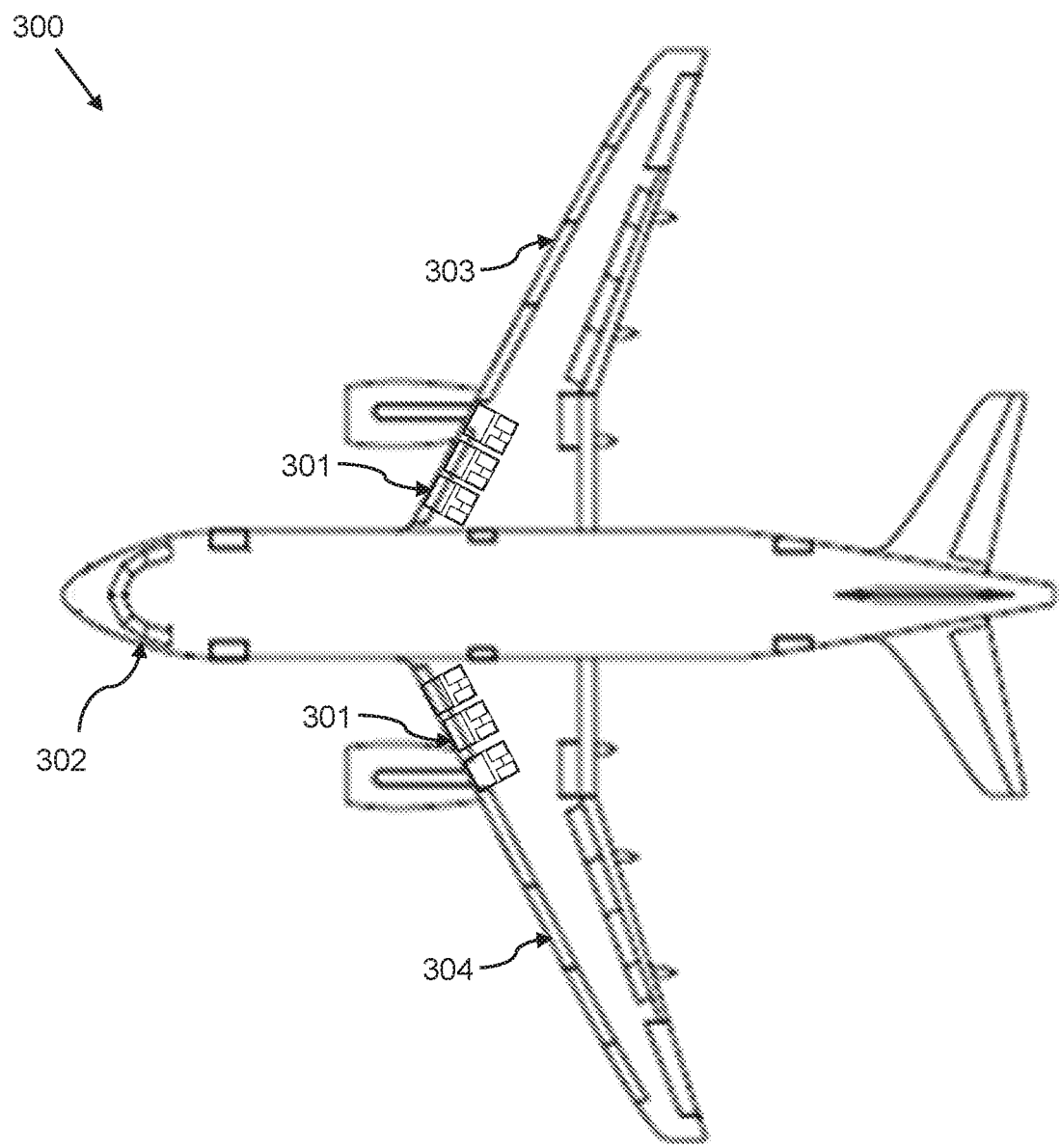
FIG. 3 shows the arrangement of a plurality of microelectronic modules on the surface of an aircraft.

FIG. 3 shows one embodiment of an arrangement 300 of a plurality of microelectronic modules 301 on the surface of an aircraft 302. In the embodiment shown, multiple microelectronic modules 301 are arranged on the wings 303, 304 of the aircraft 302 in the region of the leading edge of the wing, in order to remove or at least reduce contaminants on the leading edge of the wing. The microelectronic modules 301 are connected to each other (not illustrated), in order to achieve an improvement of the cleaning effect.

Figure 4:
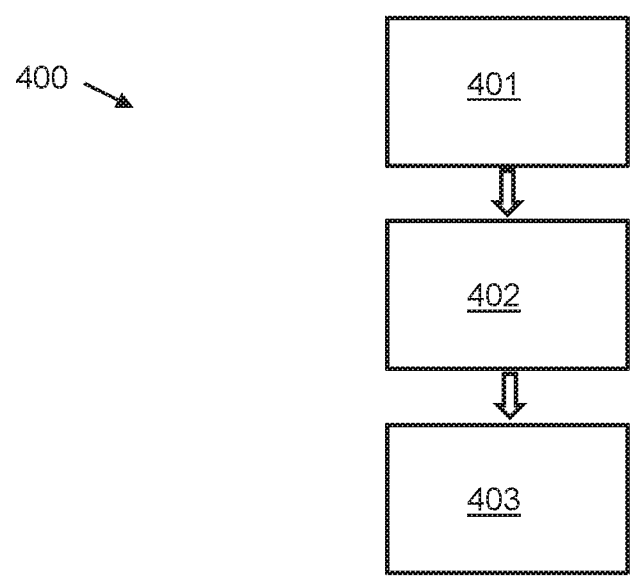
FIG. 4 shows a flow chart of a method for cleaning a surface.

FIG. 4 shows a flow chart 400 of one embodiment of a method for cleaning a surface by using at least one microelectronic module or at least one module array. In step 401, a first voltage is provided, which is converted into a second voltage which is higher than, lower than, or equal to the first voltage. In step 402, an ionic current, an electrical plasma, harmonic components and/or an electrostatic field are/is generated with the aid of the second voltage. In step 403, at least one object adhering to a surface of the module or the module array is removed by means of the generated ionic current, the electrical plasma, the harmonic waves and/or the electrostatic field.

Although the invention has been shown and described primarily with reference to certain embodiments, persons who are familiar with the technical field should understand that numerous modifications with respect to the embodiment and details can be made thereto without deviating from the nature and scope of the invention as defined by the attached claims. The scope of the invention is therefore determined by the attached claims, and it is therefore intended that all changes that fall within the literal scope or the doctrine of equivalents of the claims be included.

LIST OF REFERENCE NUMBERS 100, 201, 301 Module
101, 202 Voltage converter
102, 204 Actuator
103 Generator
104, 205 Substrate
200 Module array
203 Switching element
300 Arrangement
302 Aircraft
303, 304 Wing
400 Flow chart
401-403 Method steps
V1 First voltage
V2 Second voltage

The invention claimed is:

1. A microelectronic module configured for cleaning a surface, comprising:
at least one voltage converter for converting a provided first voltage into a higher, lower, or identical second voltage;
at least one acceleration sensor; and
circuitry in communication with a central control unit, the central control unit being in communication with the at least one acceleration sensor; and
at least one actuator, comprising at least one generator for generating an ionic current, an electrical plasma, harmonic components or an electrostatic field from the second voltage which is provided by the voltage converter;
wherein at least the voltage converter and the actuator are disposed on a thin-film, planar substrate;
wherein the microelectronic module comprises at least one detection unit comprising optical, inductance, or capacitance sensors, the detection unit configured to use at least the sensors to detect at least a presence of an object adhering to the surface;
wherein the actuator is configured to remove at least most of the at least one object adhering to the surface that was detected by the detection unit using the ionic current, the electrical plasma, the harmonic components or the electrostatic field generated by the at least one generator of the at least one actuator;
wherein the circuitry is configured to activate the microelectronic module after receiving a first signal to activate the module from the central control unit, the signal being based on a determination from the central control unit that a predetermined minimum acceleration is detected by the at least one acceleration sensor; and
wherein the circuitry is further configured such that:
if a negative acceleration is detected, then the microelectronic module is deactivated circuitry based on a corresponding signal from the central control unit; and
if a signal indicating a positive acceleration is received, then the microelectronic module is activated.

2. The microelectronic module as claimed in claim 1, wherein the voltage converter comprises a piezoelectric transformer.

3. The microelectronic module as claimed in claim 1,
wherein the provided first voltage for the voltage converter is provided, at least partially, via an external voltage source; or
wherein the microelectronic module further comprises an energy-generating element for generating at least a portion of the provided first voltage; or
wherein the energy-generating element comprises a solar cell arrangement or an energy-harvesting element.

4. The microelectronic module as claimed in claim 1,
wherein the microelectronic module comprises a plurality of actuators; or,
wherein the microelectronic module comprises at least one switching element for activating or deactivating the microelectronic module or at least one of the plurality of actuators.

5. The microelectronic module as claimed in claim 1,
wherein the microelectronic module comprises at least one sensor which is designed for gathering information regarding the microelectronic module, information regarding the adhering object or information regarding the environment of the microelectronic module, wherein the sensor is a pressure sensor, a temperature sensor or a humidity sensor.

6. The microelectronic module as claimed in claim 1,
wherein the circuitry comprises at least one receiver and a switch or controller;
wherein the microelectronic module comprises at least one transmitter which is configured for transmitting a second signal to a receiver, wherein the second signal includes at least information regarding parameters detected by the sensors of the detection unit.

7. The microelectronic module as claimed in claim 1,
wherein the microelectronic module comprises a control element which is designed for controlling the actuator depending on ascertained information or presence of at least one adhering object.

8. The microelectronic module as claimed in claim 1,
wherein the microelectronic module further comprises a sensor, a receiver, a transmitter, and a control element configured for controlling the actuator depending on ascertained information or a presence of at least one adhering object; and
wherein the voltage converter, the switching element, the actuator, the detection unit, the sensor, the receiver, the transmitter or the control element is designed as a MEMS structure.

9. A module array comprising a plurality of microelectronic modules as claimed in claim 1.

10. The module array as claimed in claim 9,
wherein the plurality of microelectronic modules is geometrically arranged such that they have a predominant direction; and
wherein the actuators of the plurality of microelectronic modules are arranged such that the at least one generator can generate a wave front or an excitation of a soliton wave having a defined direction of propagation.

11. The module array as claimed in claim 9,
wherein the module array comprises one or more control elements configured to control one or more of the one or more actuator depending on ascertained information or a presence of at least one adhering object adhering to one or more microelectronic module of the plurality of microelectronic modules; and
wherein the actuators of the plurality of microelectronic modules can be controlled by the one or more control elements in a delayed or out-of-phase manner.

12. An arrangement at least of one microelectronic module or at least one module array as claimed in claim 1 on or in a surface of a vehicle, wherein the vehicle is an aircraft, a watercraft, or a land vehicle.

13. A method for cleaning a surface by using at least one microelectronic module or at least one module array as claimed in claim 1,
converting a provided first voltage into a higher, lower, or identical second voltage;
generating an ionic current, an electrical plasma, harmonic components or an electrostatic field depending on the second voltage;
removing at least most of one object adhering on a surface of the at least one microelectronic module or of the at least one module array using the generated ionic current, electrical plasma, the harmonic waves or the electrostatic field.

14. The microelectronic module as claimed in claim 5,
wherein the microelectronic module comprises a control element which is designed for controlling the actuator depending on ascertained information or presence of at least one adhering object.

15. The microelectronic module as claimed in claim 6,
wherein the microelectronic module comprises a control element which is designed for controlling the actuator depending on ascertained information or presence of at least one adhering object.

16. The microelectronic module of claim 1, wherein the thin-film, planar substrate is a flexible and multidimensionally deformable lattice or a flexible and multidimensionally deformable film.

* * * * *